Sept. 17, 1963 H. W. COCHRANE 3,104,317

BINARY MATRIX MULTIPLIER UTILIZING COINCIDENT INPUTS AND SEQUENTIAL READ-OUT

Filed Feb. 9, 1960

4 Sheets-Sheet 1

Sept. 17, 1963 H. W. COCHRANE 3,104,317

BINARY MATRIX MULTIPLIER UTILIZING COINCIDENT INPUTS AND SEQUENTIAL READ-OUT

Filed Feb. 9, 1960 4 Sheets-Sheet 2

Sept. 17, 1963 H. W. COCHRANE 3,104,317

BINARY MATRIX MULTIPLIER UTILIZING COINCIDENT INPUTS AND SEQUENTIAL READ-OUT

Filed Feb. 9, 1960 4 Sheets-Sheet 4

United States Patent Office 3,104,317

Patented Sept. 17, 1963

3,104,317

BINARY MATRIX MULTIPLIER UTILIZING COINCIDENT INPUTS AND SEQUENTIAL READOUT

Harry W. Cochrane, Poughkeepsie, N.Y., assignor to International Business Machines Corporation, New York, N.Y., a corporation of New York Filed Feb. 9, 1960, Ser. No. 7,685
1 Claim. (235—164)

This invention relates to computing apparatus and methods.

The invention is particularly applicable to a multiplier employing a matrix of storage devices, for example, magnetic cores.

An object is to simplify and shorten the wiring of a multiplier matrix.

A further object is to adapt a multiplier matrix to cooperate with presently available binary parallel adders so that partial products may be supplied from the matrix to the adder in an orderly fashion to avoid interference between two or more partial products which contribute to one and the same binary order in the final product.

In the embodiments shown, the multiplicand and multiplier are entered into the matrix in binary form. The application of pulses representing the multiplicand and multiplier respectively combine to change certain of the cores of a core matrix from a normal state to another state, which latter state represents a partial product. Sense windings are provided which couple respectively to groups of cores each of which groups comprises cores which represent a particular value of partial product, all the cores in any one group representing the same value. The partial products are read out by means of read out pulses over a plurality of read out drive lines. Each such drive line is coupled to a group of cores in which no two cores represent the same value of partial product. The read out drive lines are pulsed sequentially, thereby sending output pulses over the sense windings to an accumulator, which may be a binary parallel adder, so that during any one read out pulse the adder receives no more than one pulse for each binary order. Between the pulsing of one drive line and the next, time is allowed for the adder to complete the addition of the partial product to the result already accumulated, including time for all carry ripples to be completed. When all the read out drive lines have been pulsed the final product will be formed in the adder.

A magnetic core as used herein is composed of magnetic material having such high retentivity of magnetic flux that its hysteresis curve is substantially rectangular in shape. Such a core, if driven magnetically substantially to saturation in one direction, as by means of a conductor coupled to the core, will become stable in the saturated state and will remain substantially indefinitely in that state, until by the application of sufficient magnetizing force in the opposite sense, as by means of the same or another conductor, it may be driven magnetically substantially to saturation in the opposite direction. Due to the steepness of the hysteresis curve of the core the transition from one state to the other is very fast and the transition will produce, in any conductor coupled to the core, a sharp and useful output signal of one polarity or the other depending upon the direction of the transition. Such a core is bistable and its two stable states may be used to represent respective items of information, for example, one state may be used to represent the binary digit "one" and the other state may be used to represent the binary digit "zero."

A core matrix as used herein is a group of magnetic cores which are interlinked by a plurality of conductors, each of which conductors is coupled to one or more of the cores in the group.

The terms "line," "conductor," and "winding" will be used herein interchangeably to mean a conductor which is coupled to one or more cores.

The normal state of a core will generally be designated as the "zero" state. A core may be "set up" or switched and will then assume the "one" state. To set up a core requires the passage of a certain amount of current through a wire coupled to the core and this current must be in the proper direction to reverse the magnetic flux in the core. A pulse of current of this amount and direction is called a "select pulse." Pulses each of half the amount required to set up a core may be passed simultaneously through two separate conductors coupled to the core in like polarity and will combine their effects to set up the core. Each such pulse is called a "half-select pulse." A core which receives only one half-select pulse over a conductor coupled thereto will not be set up and upon cessation of the current will return to its "zero" state. By the application of half-select pulses to a group of cores, one core may be set up to the exclusion of all other cores in the group. This occurs where two conductors each carrying a half-select pulse are threaded each through a plurality of cores and one or more of the cores is threaded by both conductors.

To read out the information stored in a core a read out pulse of current is impressed upon a conductor coupled to the core. This current is opposite to the select pulse or half-select pulse in its effect upon the state of the core. The read out pulse is of a polarity and amplitude to return a core to its normal state, usually the "zero" state, and to provide an output from the core if and only if said core had been previously switched to its other stable state as by two simultaneous half-select pulses affecting the core. Each core in a matrix is coupled to a conductor known as a "sense winding" which develops an output pulse when the core is switched from the set-up or "one" state to the normal or "zero" state. In general, there will be employed a plurality of sense windings each of which is coupled to a plurality of cores, so that when any one of the cores in the "one" state that is coupled to this sense winding has a read out pulse impressed upon its read out line, an output pulse will appear in the associated sense winding.

Other objects, features and advantages will appear from the following more detailed description of illustrative embodiments of the invention, which will now be given in conjunction with the accompanying drawings.

Figure 3:
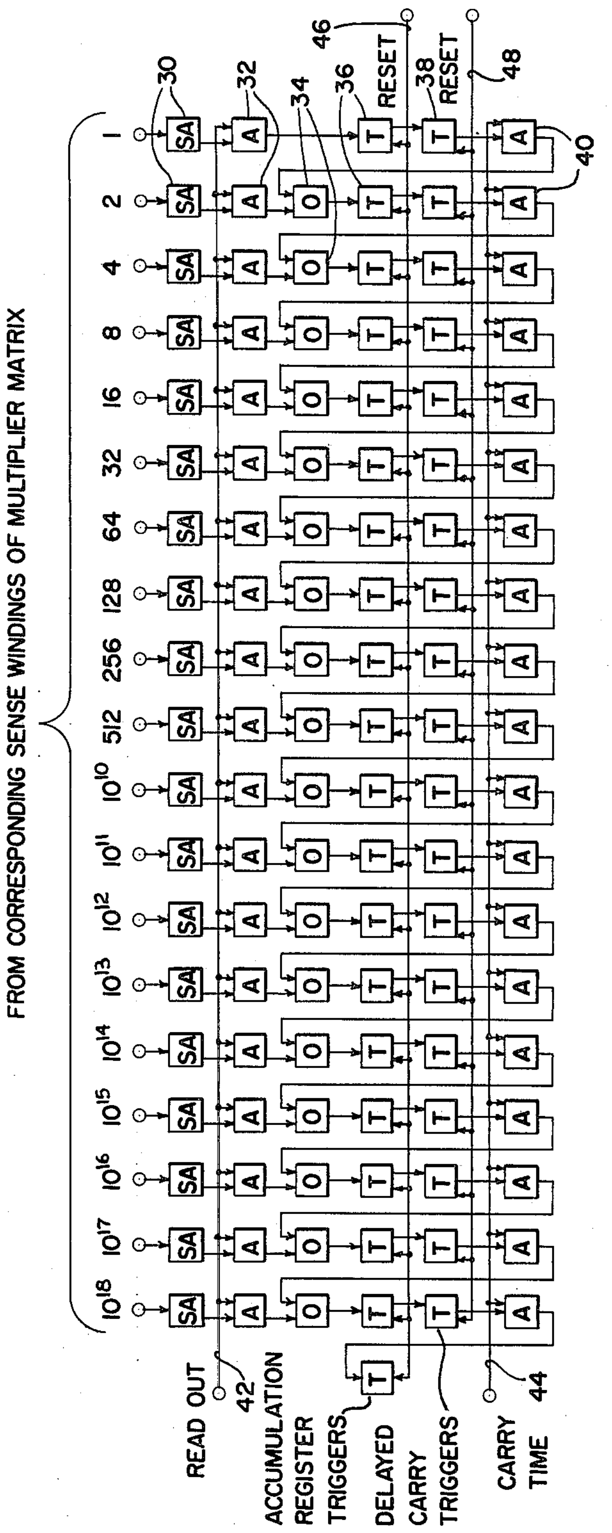
FIG. 3 is a block schematic diagram of a binary parallel adder which may be used with either of the matrices shown in FIGS. 1 and 2.
Figure 3A:
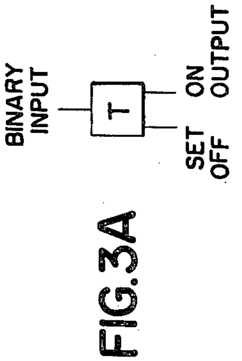

FIG. 3–A shows the terminal arrangements of triggers in FIG. 3; and

Figure 2:
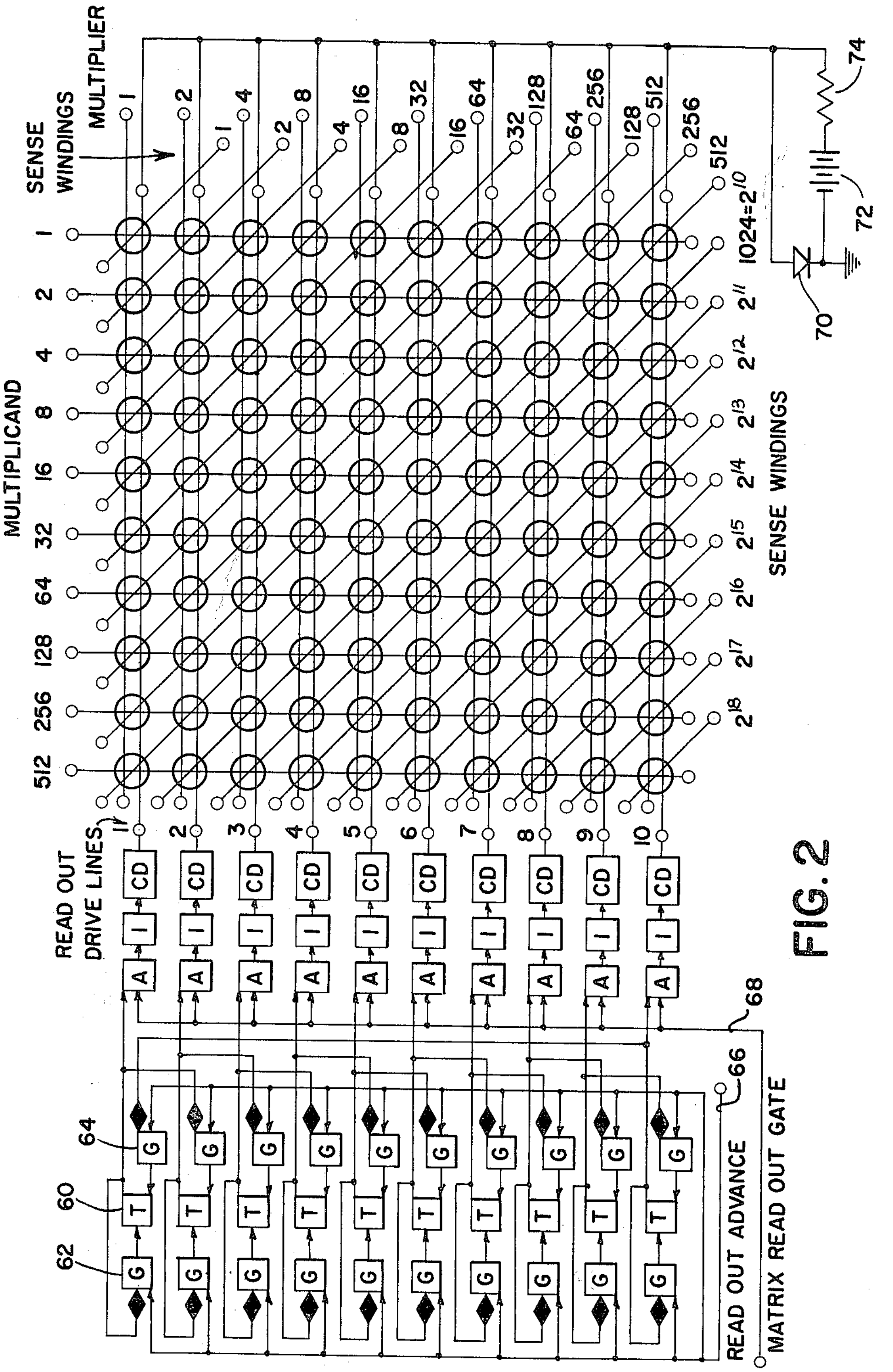

FIGS. 4 through 10 are respective schematic diagrams of a trigger, a gate circuit, an and-circuit, an inverter, a core driver, a sense amplifier, and an or-circuit, together with a symbol for each of these circuits as used in FIGS. 2 and 3.

Figure 1:
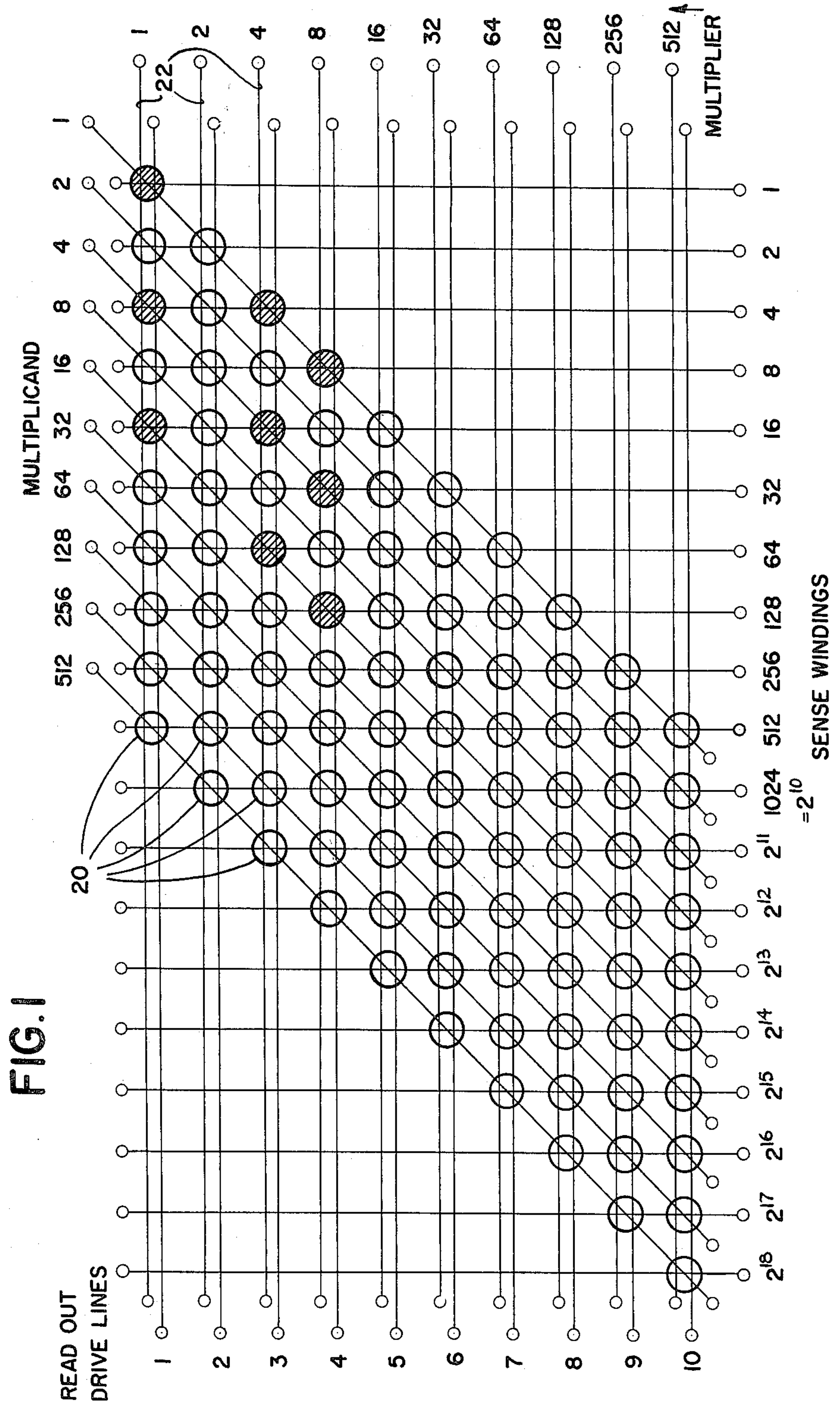
FIGS. 1 and 2 are schematic diagrams of two equivalent embodiments of the invention, showing core matrices and the mode of wiring of the cores.

FIGS. 1 and 2 show two equivalent core matrices each of which is wired for performing binary multiplication. FIG. 1 shows most clearly the manner in which the matrix is wired, while FIG. 2 shows a more compact arrangement of the cores for obtaining the same result.

In the arrangement of FIG. 1, a plurality of toroidal cores 20 are shown arranged in rows and columns. There are the same number of cores in each row and the cores in each row are shifted one space to the left relatively to the row above. Through each row of cores there is threaded or otherwise coupled one of a plurality of horizontal wires 22, each such wire being assigned a value constituting one of the powers of the number two in the series 1, 2, 4, 8, 16, etc. As shown in FIG. 1, the horizontal wires are input leads for setting up the value of the multiplier in the matrix. Through each of certain diagonal lines of cores there is threaded one of a plurality of wires for setting up the value of the multiplicand in the matrix. Each such wire is likewise assigned a value in the series 1, 2, 4, 8, 16, etc. Through each row of cores there is also threaded one of a plurality of read out drive lines. Finally, through each column of cores there is threaded one of a plurality of sense windings, to each of which is also assigned a value in the series 1, 2, 4, 8, 16, etc. The number of sense windings required is one less than twice the number of cores in a single row.

It will be noted that each core in the matrix is coupled to four wires, a multiplicand wire, a multiplier wire, a sense winding, and a read out drive line. It will be noted further that at each core the value assigned to the sense winding coupled to the core is equal to the value of the product of the multiplicand and multiplier values assigned to the multiplicand and multiplier wires respectively that are coupled to this core.

In the operation of the arrangement of FIG. 1, multiplication of two numbers each of which is an integral power of two is done by first impressing half-select pulses simultaneously upon the multiplicand wire corresponding to one of the numbers and upon the multiplier wire corresponding to the other of the numbers. This sets up the single core through which both wires pass, since this core alone receives two half-select pulses simultaneously. Other cores either in the same row or in the same column as the selected core receive only one half-select pulse and that is not sufficient to set up the core. Cores in other rows and columns do not receive any pulse and so are not set up. When it is desired to read out the result of multiplying the two numbers together, this may be done by impressing a read out pulse upon the read out drive line that passes through the particular core that was set up. The sense winding that is coupled to the core that was set up will then receive a pulse from the set-up core, indicating the value of the product. The reading out process automatically effects the resetting of the core to the unset state, thereby clearing the matrix. The value of the product of the two numbers may be recorded in any suitable register that may be connected to the sense winding. Other ways of setting up selected cores and reading the values thereof by methods other than the half-select principle above described may be used instead, if desired.

In considering multiplication of numbers which may not be integral powers of two, it will be understood that the number 1 is conventionally regarded as the zeroth power of any number and hence as the zeroth power of two. Hence the number 1 may be regarded as an integral power of two and its inclusion is essential in binary arithmetic in order that it may be possible to express the odd numbers as well as the even numbers in terms of the sum of a series of integral powers of two. In this way, any whole number may be so expressed.

The manner in which numbers which are not integral powers of two may be multiplied together by use of the matrix shown in FIG. 1 will be explained by means of an illustration. Suppose the multiplicand is 21 and the multiplier is 13. The multiplicand may be expressed in terms of powers of two as follows:

$$21=16+4+1$$

The multiplier may be expressed as:

$$13=8+4+1$$

The product 273 may be expressed as:

$$\begin{aligned}273&=(16+4+1)(8+4+1)\\&=(16)(8)+(16)(4)+(16)(1)+(4)(8)+(4)(4)\\&\quad+(4)(1)+(1)(8)+(1)(4)+(1)(1)\end{aligned}$$

To set up the proper cores by the half select principle, half-select pulses are impressed upon the multiplicand wires of the assigned values 16, 4 and 1, and upon the multiplier wires of the assigned values 8, 4 and 1. The cores at the crossings of the energized multiplicand and multiplier wires are set up, as indicated by cross-hatching of the core symbols in FIG. 1. The product 273 may be obtained by summing up all the partial products, nine in number in the example under consideration. The summing may be done by means of any suitable binary parallel adder which may be connected to the plurality of sense windings shown in FIG. 1, such for example as the one shown in FIG. 3. In the example, the column of cores coupled to the sense winding 4 contains two set-up cores, and the column of cores coupled to the sense winding 16 also contains two set-up cores. The information contained in two or more set-up cores cannot be read out over a single sense winding into the usual type of binary adder without an erroneous result. Therefore, it is essential that the read out drive lines be pulsed sequentially, one at a time.

In the example, a read out pulse impressed upon the read out drive line 1 causes pulses to be read out over the sense windings 16, 4 and 1. These output pulses when transmitted to a binary adder will cause the adder to accumulate a partial sum of 21. A read out pulse impressed upon the read out drive line 3 produces no output pulses inasmuch as there are no set-up cores coupled to this drive line. A read out pulse impressed upon the read out drive line 3 causes pulses to be read out over the sense windings 64, 16 and 4. These output pulses when transmitted to the binary adder cause the adder to add 84 to the 21 already in the adder to give a partial sum of 105. A read out pulse impressed upon the read out drive line 4 causes pulses to be read out over the sense windings 128, 32 and 8. These output pulses when transmitted to the adder cause the adder to add 168 to the 105 already in the adder to give the final sum of 273.

In the arrangement of FIG. 1 there are shown ten multiplicand wires and ten multiplier wires, the complete matrix containing one hundred cores. The largest value of multiplicand or multiplier which the arrangement can accommodate is 1023 which is the sum of all the powers of two from 512 down to and including 1. It will be noted that the number 1023 is one less than 1024, and that 1024 is two to the tenth power. Therefore, 1023 times 1023, which is less than 1024 times 1024, is less than the twentieth power of two. Accordingly, the largest value which the product can attain in the matrix of FIG. 1 is expressible as the sum of partial products no one of which is greater than the nineteenth power of two. Moreover, it will be noted that the largest partial product represented by any one set-up core is 512 times 512 which is the eighteenth power of two. It may be concluded, therefore, and the drawing shows, that nineteen sense wires are required. The adder, however, must be able to accommodate one additional digit to take care of a carry into the twentieth position which represents the nineteenth power of two.

In general, where the number of binary digits in multiplicand and multiplier are the same, which number may be called N, the number of cores required in the matrix is $N^2$, the number of sense windings needed is $2N-1$, and the number of binary digits to be accommodated in the binary adder is 2N. It will be evident, however, that the number of digits accommodated in the multiplicand and multiplier need not be the same, and that the number of cores, sense windings, and digits accommodated in the adder may be adjusted accordingly.

FIG. 2 shows how the arrangement of FIG. 1 may be transformed into a more compact configuration without any essential change in the wiring scheme and in addition shows illustrative means for sequentially pulsing the read out drive lines. The transition from the arrangement of FIG. 1 to that of FIG. 2 may be viewed as being accomplished by sliding all the cores of all the rows but one along the multiplier wires and read out drive lines until the cores are in ten vertical columns. The multiplicand lines then become vertical instead of diagonal while the sense windings become diagonal instead of vertical. The diagonal lines in FIG. 1 run downward to the left whereas those in FIG. 2 run downward to the right.

It will be evident that many other arrangements of the cores are possible while retaining any given wiring scheme. Vertical and horizontal alignments of the cores are not essential but are usually most convenient for assembling and mounting of the matrix.

Ferrite cores of toroidal shape and as small as 0.030 inch inside diameter and 0.050 inch outside diameter may be used, for example. Such cores permit the assembling of complicated core matrices in very limited spaces.

FIGS. 2 and 3 show certain components in block diagram form with letter identifications, comprising triggers T, gates G, and-circuits A, inverters I, core drivers CD, sense amplifiers SA, and or-circuits O. Illustrative examples of such components are shown in FIGS. 4 through 10. These components in themselves do not constitute any part of the inventive concepts of the present invention and for that reason will not be described in detail herein. There follows a brief description of each such component.

A trigger, commonly known as the Eccles-Jordan trigger, functions as a storage or control device or as a counter, inasmuch as it is a bistable device, that is, one that remains in either one of two stable states until it is forced or triggered by an input signal of a predetermined polarity to assume the other state.

As used herein, one state of the trigger is called the "off" state and the other is called the "on" or "set" state. The "off" state is also called the "reset" state. When the trigger is on, it produces an output potential which may be used to condition an and-circuit, operate an or-circuit, serve as an input signal for an associated second trigger, or for other purposes.

Figure 4:
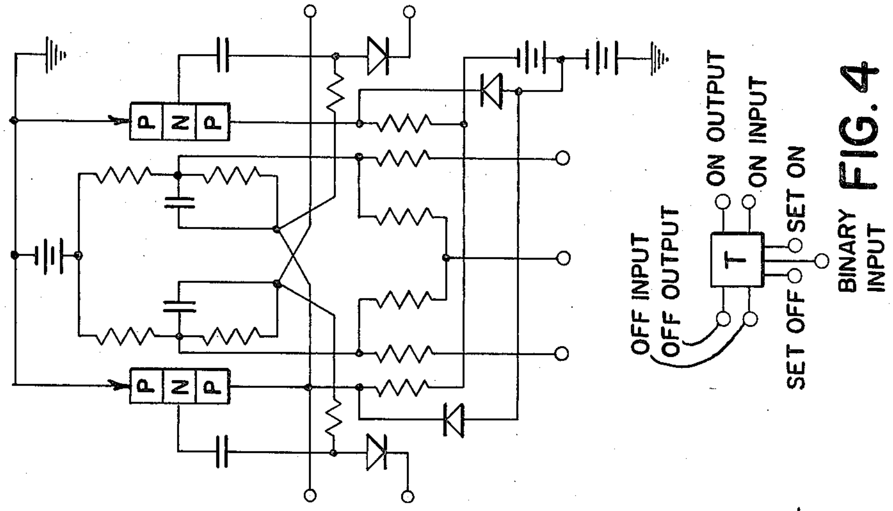

A trigger may have as many as five input terminals and two output terminals as shown in FIG. 4, of which any or all may be used in any given application. The binary input is used to turn the trigger on if it is off or to turn it off if it is on, each subsequent input signal of the proper polarity being effective to change the state of the trigger. The "on input" is effective to turn the trigger on it it is off but has no effect if the trigger is already on. Similarly, the "off input" is effective to turn the trigger off if it is on but has no effect if the trigger is already off. By means of the "set off" input the trigger may be reset whenever desired and by means of the "set on" input the trigger may be set on. A positive or relatively high potential output is available at the "on output" when the trigger is on and a negative or relatively low or more negative potential is available when the trigger is off. At the "off output" a relatively negative output potential is available when the trigger is on and a relatively positive output potential is available when the trigger is off.

Figures 5, 6, 7, 8, 9, 10:
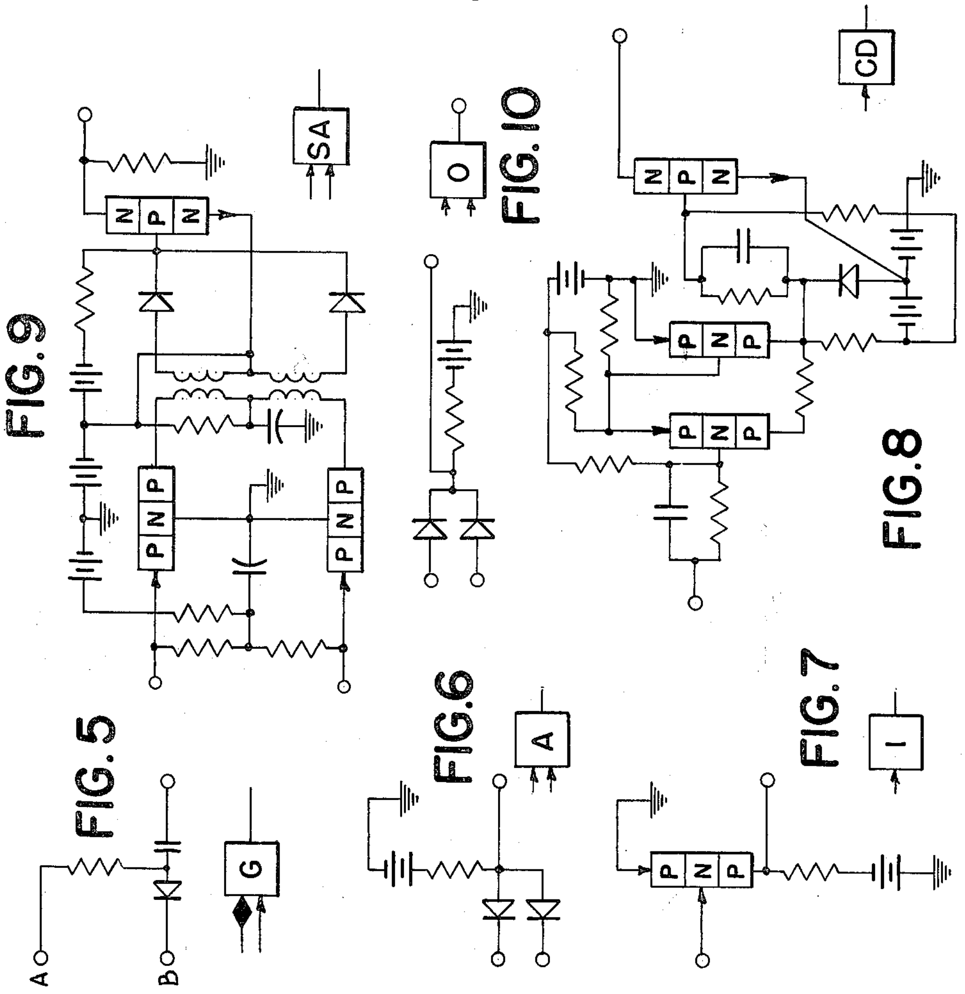

The gate circuit shown in FIG. 5 may be termed a negative diode gate. The circuit comprises a diode, the cathode of which is connected to the input terminal A while the anode is connected via a capacitor to the output terminal and via a resistor to a supply terminal B. The terminals A and B are normally biased so that the diode is cut off and the output terminal is at a potential determined by the circuit to which it is connected. If a positive pulse is applied to the terminal A, the potential at the cathode is driven more positive, thereby maintaining the diode in a cut off condition. If a positive signal is applied to the terminal B, the potential at the anode is raised to a more positive value causing the diode to conduct and the gate is said to be conditioned. Now, if a positive pulse is applied to the input terminal A, the positive shift of potential at the leading edge of the pulse raises the potential at the cathode to a more positive potential than that existing at the anode and the diode is cut off. The potential at the anode then rises exponentially to approximately that value existing at the terminal A, whereupon the diode again conducts and the potental at the anode stops rising and is maintained at the value existing at terminal A. When the negative shift of potential at the trailing edge of the positive input pulse appears at the terminal A, it instantaneously appears at the anode of the diode, as the resistance across a conducting diode is negligible. Further, since the potential across a capacitor cannot change instantaneously, the potential at the output terminal follows the same instantaneous negative shift of potential and then rises rapidly to its quiescent state. Thus, it is apparent that if the diode gate is properly conditioned, it will generate a sharp negative pulse or spike in response to a negative shift in potential at the terminal B.

The and-circuit shown in FIG. 6 functions to produce an output signal of positive or relatively high potential if and only if there is a coincidence of positive or relatively high potential signals at both of the input terminals of the device. The input signals do not necessarily start simultaneously but must all be present at one time in order that an output signal may be produced. Hence, in instances where a signal is present on one of the two input terminals, the circuit is conditioned so that when an input signal is applied to the other input terminal there is then a coincidence of input signals causing the production of an output signal. Unlike the gate circuit described above, the order of application of the input signals is not important.

The inverter shown in FIG. 7 is a transistor circuit which gives a relatively low output potential in response to a relatively high potential input signal and a relatively high output potential in response to a relatively low potential input signal.

The core driver shown in FIG. 8 is a transistor device of the current amplifier type, having relatively large power output suitable for simultaneously driving a plurality of cores in an array. The core driver is turned on by the application of a negative input potential.

The sense amplifier shown in FIG. 9 is a transistor device for amplifying pulses such as the pulses generated in the sense windings of a core matrix.

The or-circuit shown in FIG. 10 functions to isolate two or more input signal circuits from each other and to produce a positive or relatively high potential output signal in response to a positive or relatively high potential input signal on either or both of the input terminals of the device.

Further details concerning circuits of the general types shown in FIGS. 4–10 may be found by reference to the following copending applications:

Serial No. 592,545, filed June 20, 1956, on Data Coordinator by R. A. Gregory et al.

Serial No. 631,765, filed December 31, 1956, on Character Recognition Machine by Gerald L. Shultz.

Both of the above-entitled applications are assigned to the assignee of the present application.

Further reference may also be made to "Scientific Encyclopedia," third edition, published in 1958, by D. Van Nostrand Co., Princeton, N.J. and "Reference Data for Radio Engineers," fourth edition, published in 1956, by International Telephone and Telegraph Corporation, New York, N.Y., particularly pp. 467, 886 and 887.

In the sequential read out drive system of FIG. 2, there is provided a trigger T for each drive line. Each trigger is provided with an on input gate and an off input gate. The on output of a given one of the triggers is connected to the conditioning or A terminal of its own off input gate and also to the conditioning or A terminal of the on input gate of the trigger for the drive line of next higher number. The output of the trigger for the number 10 drive line is connected to the on input gate of the trigger for the number 1 drive line. For the number 1 drive line, the trigger is indicated by reference number 60, the associated off input gate by 62 and the associated on input gate by 64. The output of each trigger is connected to its associated read out drive line via an and-circuit, an inverter and a core driver. Only one trigger is on at a time. The trigger that is on conditions its own off input gate and the on input gate of the next trigger. A read out advance pulse line 66 is provided which is connected to the B terminals of all the gates. When a read out advance pulse is applied to the line 66, the trigger that is on is turned off and the next trigger is turned on. A matrix read out gate line 68 is provided which is connected to all the and-circuits. When a matrix read out gate pulse is applied to the line 68, the trigger that is on applies a positive pulse to its associated inverter through the associated and-circuit. The inverter applies the negative pulse necessary to turn on the associated core driver which in turn pulses the drive line. By means of a sequence of ten pulses over the line 66, accompanied by a positive pulse on the line 68, the drive lines may be pulsed in sequence. The gate pulse on line 68 may end when line number 10 has been pulsed. At a later time, a new gate pulse may be applied to the line 68 and another sequence of ten advance pulses applied to the line 66.

FIG. 3 shows a row of sense amplifiers 30, one for each sense winding in the amplifier. The output of each sense amplifier is fed through one of a plurality of and-circuits 32 and thence through one of a plurality of or-circuits 34 to the binary input of one of a plurality of triggers 36 which will be designated as the accumulator register triggers. The "on" output of each accumulator register trigger is connected to the binary input of one of a plurality of triggers 38 which will be designated as the delayed carry triggers.

FIG. 3–A shows the arrangement of the trigger terminals as used for clarity in FIG. 3.

The "on" output of each delayed carry trigger is connected to the input of one of a plurality of and-circuits 40 the output of which is connected in turn to the input of one of the or-circuits 34. The last-mentioned connection is such that the and-circuit 40 associated with a given binary position is connected to the or-circuit 34 associated with the binary position of next higher order. Certain exceptions to the general wiring scheme occur in the end binary positions. At the right-hand end, no or-circuit 34 is needed, since there is no carry into the lowest binary order which is represented in the right-handmost binary position. At the left-hand end, an additional accumulator register trigger 36 is required to take account of carry from the sense winding of highest binary value in the multiplier matrix. If the adder is to be used exclusively in multiplication, it is possible also to dispense with the delayed carry trigger 38 and the and-circuit 40 shown in FIG. 3 in the right-handmost binary position, because in multiplying two binary numbers together there will never be more than one output signal received over the sense winding 1 and hence never any carry from the lowest binary order to the next lowest. Since there will be no carry to the next lowest binary order, the or-circuit 34 shown in FIG. 3 in the second binary position from the right may also be omitted. In this case, the and-circuit 32 in the second binary position will have its output connected directly to the input of the associated trigger 36. In general, however, where the adder may be used in various combinations of additions and multiplications successively, the full complement of components as shown in FIG. 3 is needed.

A read out lead 42 is provided which is connected in parallel to the inputs of all the and-circuits 32. A carry time lead 44 is provided which is connected in parallel to the inputs of all the and-circuits 40. Reset leads 46 and 48 are provided for resetting the accumulator register triggers and the delayed carry triggers respectively to their off states.

In the operation of the binary parallel adder of FIG. 3, a read out pulse is impressed simultaneously upon the read out lead 42 whenever a pulse is applied to any one of the read out drive lines in the multiplier matrix. Upon the application of such read out pulse, the output pulses coming over the respective sense windings are amplified in the respective sense amplifiers 30 and the amplified pulses combine with the read out pulse on lead 42 to actuate such of the and-circuits 32 as receive an amplified sense pulse. The pulses from such of the and-circuits as are actuated are transmitted through the associated or-circuit 34, if any, to change the state in each of the associated accumulator register triggers that receives a pulse. Those of the accumulator register triggers that do not receive a pulse remain in whichever state they happen to be in.

Each accumulator register trigger which changes state from the "one" state to the "zero" state generates an output pulse which is immediately transmitted into the associated delayed carry trigger 38. The carry triggers have all been previously reset so that each carry trigger that is pulsed is put into the "one" state, representing a carry.

Before another read out operation is initiated, and after all the triggers have reached a steady state after the read out operation just described, a carry timing pulse of relatively long duration is impressed upon the carry time lead 44. The carry timing pulse combines with the "one" state output of each carry trigger that is in the "one" state to actuate the associated and-circuit 40. The and-circuit 40 so actuated sends a pulse through the or-circuit 34 of the next higher binary order to change the state of the accumulator register trigger in that next higher binary order. In case the last-mentioned trigger is already in the "one" state, this trigger will send out a pulse to its associated delayed carry trigger. This associated delayed carry trigger will always be found in the "zero" state in this situation, as may be verified by observation of examples in binary addition or from the theory of binary addition. Accordingly, the delayed carry trigger in question will change over to the "one" state.

Since the carry time pulse still remains upon the carry time lead 44, the delayed carry trigger that has now changed over to the "one" state combines with the carry time pulse to send a pulse through the associated and-circuit 40 and the or-circuit 34 of the next higher binary order and thence to the accumulator register trigger 36 of that next higher binary order. In case the last-mentioned trigger is already in the "one" state, the above described process repeats itself, in a form of chain reaction which continues until an accumulator register trigger is reached which is in the "zero" state. This trigger is then changed to the "one" state and the reaction is ended. The chain reaction of carry pulsing is termed a "carry ripple" and the duration of the carry time pulse is to be made long enough to allow for full carry ripple throughout all the binary orders in which delayed carries are required. It will be noted that any of the initial carries stored in the respective delayed carry triggers may initiate a carry ripple and that two or more of these ripples may occur simultaneously.

At the end of the carry time pulse, a reset pulse is to be sent over the reset line 48 to reset all the delayed carry triggers to the "zero" state. Then another read out drive line of the multiplier matrix may be pulsed and the above process repeated, thereby adding another set of partial products to the sum accumulated in the adder, as stored in the accumulator register triggers.

When all the read out drive lines in the multiplier matrix have been pulsed in sequence, and the last carry ripple has ended, the multiplication will have been completed and the product of the two binary numbers to be multiplied will be found in the accumulator register triggers, from which it may be read out or stored in a memory register as desired. When the product is no longer required, the reset line 46 may be pulsed to reset all the accumulator register triggers and thus to clear the adder.

As has been suggested above, it can be shown that, if at any time the accumulator register trigger associated with a given binary order is in the "one" state and a carry is received by this trigger, there will not at that time be any previous carry stored in a delayed carry trigger to be transmitted from the given binary order to the next higher order. That this is true may be seen by considering that the only way that an accumulator register trigger can arrive at the "one" state is either to change from "zero" to "one" by reception of a pulse, or to start from the "one" state and remain in the "one" state in the absence of a pulse. In the first case, the operation is 0 plus 1 which equals 1 with no carry, and in the second case, the operation is 1 plus 0 which also equals 1 with no carry. Otherwise stated, a trigger emits no output pulse in passing from the "zero" state to the "one" state nor when it remains in the "one" state. An output pulse is emitted only when a trigger passes from the "one" state to the "zero" state. Because of this property of the carry process, the carry ripple takes due account of propagated carries extending over any number of binary orders.

In the matrix of either FIG. 1 or FIG. 2, there may be recognized three coordinate axes of reference, namely, the multiplicand axis, the multiplier axis, and the sense or partial product axis. In FIG. 1, the multiplicand axis is diagonal, the multiplier axis is vertical with horizontal multiplier lines of different values running perpendicular to this axis, and the partial product axis is horizontal with vertical sense lines of different values running perpendicular to the partial product axis. In FIG. 2, the multiplicand axis is horizontal, the multiplier axis is vertical, and the partial product axis is diagonal.

To clamp the potential at the right hand end of each read out drive line in FIG. 2 close to ground potential, a diode 70 may be connected with its anode in common to all the read out drive lines and its cathode grounded. A current supply source 72 to serve the output NPN transistor of whichever core driver is in operation at a given time may be connected in parallel with the diode and is shown as a battery with the negative terminal grounded. A protective resistor 74 may be provided in series with the source 72 to guard against burn-out of the diode and to form a constant current supply or current sink in conjunction with the source 72. The current supplied to the NPN transistor may be a small fraction of the total current furnished by the source 72.

While binary multiplication has been illustrated, it is to be understood that the principles of the invention may be applied also to multiplication of numbers expressed in notations other than binary, such as tertiary or decimal.

The invention is not limited to multiplication, and may be applied to other uses, for example, to column shifting of information items, as for combining two or more data words into a compound data word, and for masking.

While illustrative forms of apparatus and a method in accordance with the invention have been described and shown herein, it will be understood that numerous changes may be made without departing from the general principles and scope of the invention.

What is claimed is:

In a magnetic core matrix binary multiplier, in combination:

an $n$ by $m$ array of bistable magnetic cores having rectangular hysteresis loop characteristics (where $m$ and $n$ represent any whole numbers), said array including $n$ groups of cores, each group including $m$ cores;

the $m$ cores of the first group representing products $2^0\times2^0$, $2^0\times2^1$, $2^0\times2^2$ . . . $2^0\times2^{(m-1)}$, respectively, the $m$ cores of the second group representing products $2^1\times2^0$, $2^1\times2^1$, $2^1\times2^2$ . . . $2^1\times2^{(m-1)}$, respectively, and so on in that order up to the $n$th group the cores of which represent products $2^{(n-1)}\times2^0$, $2^{(n-1)}\times2^1$, $2^{(n-1)}\times2^2$ . . . $2^{(n-1)}\times2^{(m-1)}$ respectively;

a first set of $n$ input lines each of which input lines is inductively coupled to all of the cores of a different one of said $n$ groups of cores;

a second set of $m$ input lines each of which is inductively coupled to a single core in every one of said $n$ groups of cores, each of the input lines of said second set coupling cores from the several groups which represent products having one common factor;

a set of $n$ read-out drive lines each of which is inductively coupled to all of the cores of a different one of said $n$ groups of cores;

a set of output sense lines each inductively coupled to all of the cores in said array which represent the same partial product value, the individual sense lines representing all partial products from $2^0\times2^0$ up to and including $2^{(n-1)}\times2^{(m-1)}$;

means to enter a multiplicand into the matrix by impressing half-select drive pulses upon a selected plurality of the input lines of said first set of $n$ input drive lines;

means operative simultaneously with said last-mentioned means to enter a multiplier into the matrix by impressing half-select pulses upon a selected plurality of the input line of said second set of $m$ input drive lines, whereby certain cores receive two half-select pulses simultaneously and are set up thereby to represent partial products of the multiplication of said multiplicand and said multiplier, which cores on any one of said sense lines all have the same value of partial product; and means for sequentially applying read-out pulses to each of said read-out drive lines, whereby each read-out pulse reads out information from not more than one core coupled by any given sense line, and whereby the total number of input drive lines and read-out lines combined does not exceed $2n+m$.

References Cited in the file of this patent

UNITED STATES PATENTS

| | | |
|---|---|---|
| 2,428,812 | Rajchman | Oct. 14, 1947 |
| 2,947,977 | Bloch | Aug. 2, 1960 |

FOREIGN PATENTS

| | | |
|---|---|---|
| 1,101,201 | France | Apr. 20, 1955 |
| 1,182,936 | France | Jan. 19, 1959 |
| 841,277 | Great Britain | July 13, 1960 |